United States Patent
Le et al.

(10) Patent No.: US 9,147,194 B1
(45) Date of Patent: Sep. 29, 2015

(54) AGGREGATED PERFORMANCE INFORMATION FOR VIDEO CONTENT ITEMS

(75) Inventors: Phuong B. Le, Belmont, CA (US); Jonathan Goldman, San Francisco, CA (US); Baljeet Singh, San Francisco, CA (US); Lane P. Shackleton, San Francisco, CA (US)

(73) Assignee: Google Inc., Mountain View, CA (US)

( * ) Notice: Subject to any disclaimer, the term of this patent is extended or adjusted under 35 U.S.C. 154(b) by 1041 days.

(21) Appl. No.: 13/241,589

(22) Filed: Sep. 23, 2011

(51) Int. Cl.
*G06Q 30/02* (2012.01)
*G06Q 30/06* (2012.01)

(52) U.S. Cl.
CPC ............ *G06Q 30/02* (2013.01); *G06Q 30/0203* (2013.01)

(58) Field of Classification Search
USPC ......................................................... 709/206
See application file for complete search history.

(56) References Cited

U.S. PATENT DOCUMENTS

| | | | |
|---|---|---|---|
| 7,824,268 B2 | 11/2010 | Harvey et al. | |
| 8,074,882 B2 | 12/2011 | Dmitriev et al. | |
| 8,132,200 B1 | 3/2012 | Karam | |
| 2005/0027619 A1* | 2/2005 | Basak et al. | 705/27 |
| 2007/0250901 A1* | 10/2007 | McIntire et al. | 725/146 |
| 2008/0146342 A1 | 6/2008 | Harvey et al. | |
| 2008/0154889 A1 | 6/2008 | Pfeiffer | |
| 2010/0186041 A1 | 7/2010 | Chu et al. | |
| 2011/0028221 A1 | 2/2011 | Relyea et al. | |
| 2011/0247027 A1 | 10/2011 | Davis et al. | |
| 2012/0116868 A1* | 5/2012 | Chin et al. | 705/14.43 |

FOREIGN PATENT DOCUMENTS

WO WO98/19450 5/1998

* cited by examiner

*Primary Examiner* — Angela Nguyen
(74) *Attorney, Agent, or Firm* — Amin, Turocy & Watson, LLP

(57) ABSTRACT

Methods, systems, and apparatus, including computer programs encoded on a computer-readable storage medium, including a method for presenting aggregated performance information for video content items. The method comprises identifying a video content item displayable in a plurality of different format types to users. The method further comprises collecting performance information related to the display of the video content item when presented in each of the different format types. The method further comprises aggregating the performance information for the different format types, where the performance information includes information selected from a group comprising a number of thumbnail impressions, a number of video impressions, a number of views, a view rate, an average cost-per-view, a total cost, or a number of clicks to a landing page, including providing overall performance information for the video content item. The method further comprises presenting the aggregated performance information for the video content item.

20 Claims, 4 Drawing Sheets

AGGREGATED PERFORMANCE INFORMATION FOR VIDEO CONTENT ITEMS

BACKGROUND

This specification relates to information presentation.

The Internet provides access to a wide variety of resources. For example, video and/or audio files, as well as web pages for particular subjects or particular news articles, are accessible over the Internet. Access to these resources presents opportunities for other content (e.g., advertisements) to be provided with the resources. For example, a web page can include slots in which content can be presented. These slots can be defined in the web page or defined for presentation with a web page, for example, along with search results.

Content item slots can be allocated to content sponsors through an auction or a reservation system. For example, content sponsors can provide bids specifying amounts that the sponsors are respectively willing to pay for presentation of their content. In turn, an auction can be performed, and the slots can be allocated to sponsors according, among other things, to their bids and/or the relevance of the sponsored content to content presented on a page hosting the slot or a request that is received for the sponsored content.

SUMMARY

In general, one innovative aspect of the subject matter described in this specification can be implemented in methods that include a method for presenting aggregated performance information for video content items. The method comprises identifying a video content item, the video content item being displayable in a plurality of different format types to users. The method further comprises collecting performance information related to the display of the video content item when presented in each of the different format types, where the performance information includes information selected from a group comprising a number of thumbnail impressions, a number of video impressions, a number of views, a view rate, an average cost-per-view, a total cost, or a number of clicks to a landing page. The method further comprises aggregating the performance information for the different format types, including providing overall performance information for the video content item. The method further comprises presenting the aggregated performance information for the video content item.

These and other implementations can each optionally include one or more of the following features. The format type can be search-result-embedded, where the format type includes video content items that include a user-selectable thumbnail image or icon that is embedded inside a search result. The format type can be selected-from-group, where the format type includes video content items that are user-selectable from a group of thumbnails of video content items. The format type can be in-display, where the format type includes video content items that appear as a user-selectable thumbnail within a banner or other display. The format type can be stream-embedded, where the format type includes video content items that play before, during or after video content viewed by a user. Collecting can include determining when a video content item is presented, determining the format type, gathering performance information for the presentation, and storing the performance information. Collecting can include determining if the video content item was viewed during the presentation. Collecting can include determining a percentage portion of the video content item that was viewed during the presentation. Collecting can include determining if the user clicked through to a web page associated with the video content item. Collecting can include determining networks on which the video content item is presented and where aggregating includes aggregating performance information for each network. Aggregating can include aggregating performance information for each format type. Presenting can include presenting a user interface including providing aggregated performance information to a sponsor of the video content item. The user interface can include controls for controlling a presentation format and content of the aggregated performance information. Presenting can include presenting performance information for the video content item in conjunction with performance information for each of the format types. The format types can have one or more levels of subtypes. Presenting can include providing a report that includes the aggregated performance information.

In general, another innovative aspect of the subject matter described in this specification can be implemented in systems that include a content management system that provides content items responsive to received requests. The content management system includes a performance information collector that collects performance information corresponding to presentations of a video content item that is presented in different format types where the performance information includes information selected from a group comprising a number of thumbnail impressions, a number of video impressions, a number of views, a view rate, an average cost-per-view, a total cost, or a number of clicks to a landing page. The content management system further includes a performance information aggregator that aggregates the collected performance information relative to each of the different format types and summarizes the collected performance information relative to the video content item. The content management system further includes an interface for presenting the aggregated performance information.

In general, another innovative aspect of the subject matter described in this specification can be implemented in computer program products that include a computer program product tangibly embodied in a computer-readable storage device and comprising instructions that, when executed by a processor, perform a method for providing content. The method comprising identifying a video content item, the video content item being displayable in a plurality of different format types to users. The method further comprises collecting performance information related to the display of the video content item when presented in each of the different format types, where the performance information includes information selected from a group comprising a number of thumbnail impressions, a number of video impressions, a number of views, a view rate, an average cost-per-view, a total cost, or a number of clicks to a landing page. The method further comprises aggregating the performance information for the different format types, including providing overall performance information for the video content item. The method further comprises presenting the aggregated performance information for the video content item.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This document describes methods, processes and systems for aggregating performance information for video content items (e.g., advertisements (or ads)). The aggregated performance information is based on performance information that is collected for each of the different format types for which the video content item can appear. By presenting performance information for each of the formats and then for the video as a whole, a user (e.g., the advertiser who sponsored the ad) can view and compare performance information for each of the format types.

For example, a content sponsor (e.g., an advertiser) can create a single "video ad" which can be implemented in a different ad creative for each of the different display formats (e.g., search-result-embedded format, selected-from-group format, in-display format, stream-embedded format, or other formats as described below). Each ad creative can then be served separately, and each can accrue its own performance statistics. In some implementations, the ad creatives can be related with a common identifier (e.g., a database ID) that is unique to the video ad. The performance statistics for each ad creative can then be aggregated together for presentation to the content sponsor (e.g., advertiser) as a roll-up corresponding to the overall performance for the video ad. The individual subsets of performance statistics for the ad creatives can be separately rolled up or presented individually to give segmentations of the performance of specific display formats within the video ad. In some implementations, performance information for an ad creative can be collected over time. For example, collected performance information can include statistics for the number of thumbnail impressions, the number of video impressions, the number of views, the view rate, the average cost-per-view, the total cost, or the number of clicks to a landing page or video item. Other information can be collected that is commercially important to advertisers, content sponsors, etc.

Figure 1:
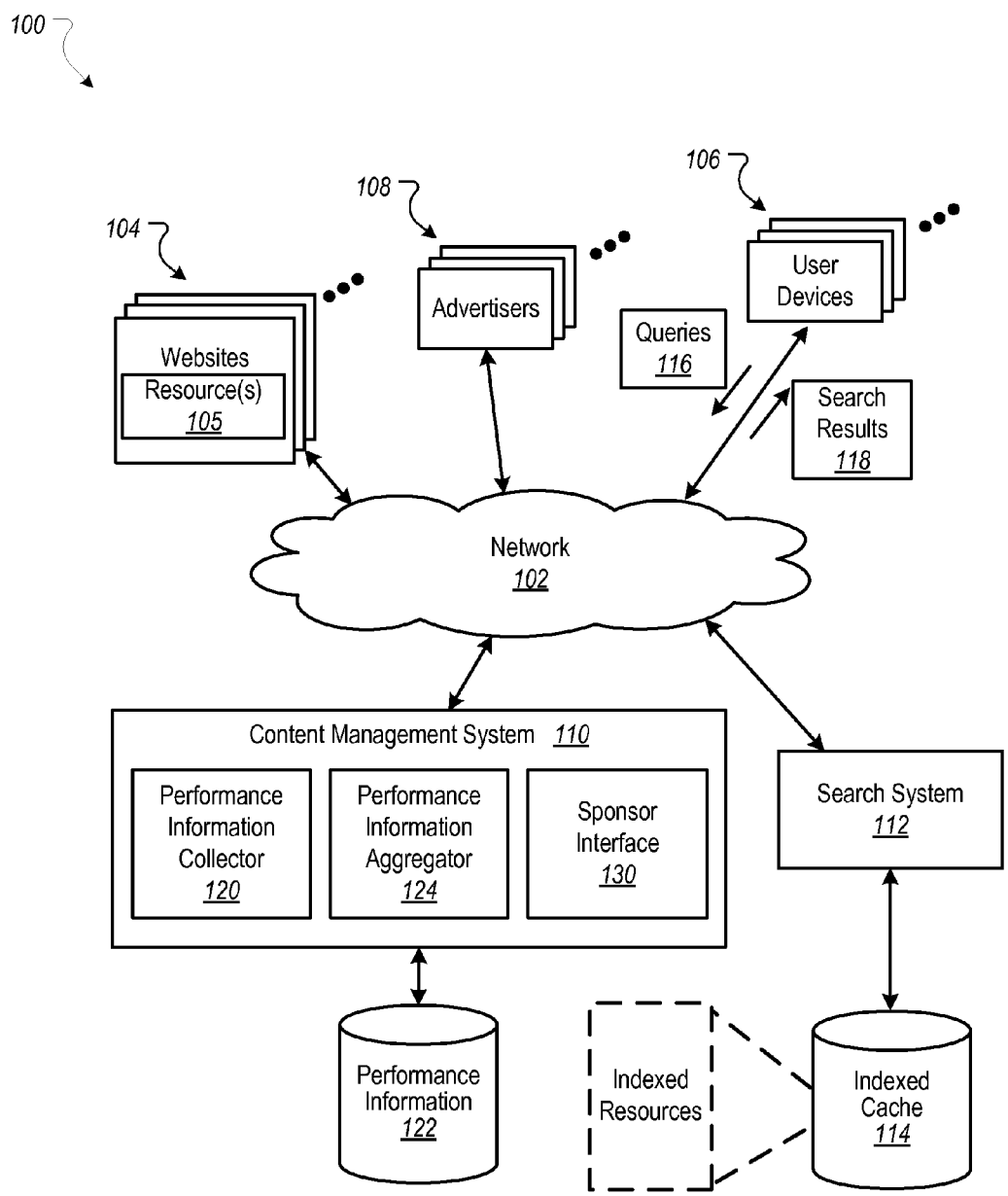
FIG. 1 is a block diagram of an example environment for presenting content.

FIG. 1 is a block diagram of an example environment 100 for presenting content. The example environment 100 includes a content management system 110 for selecting and providing content in response to requests for content. The example environment 100 includes a network 102, such as a local area network (LAN), a wide area network (WAN), the Internet, or a combination thereof. The network 102 connects websites 104, user devices 106, content sponsors (e.g., advertisers 108), and the content management system 110. The example environment 100 may include many thousands of websites 104, user devices 106, and content sponsors (e.g., advertisers 108).

In some implementations, the content management system 110 includes a performance information collector 120 that collects performance information corresponding to the presentation of a video content item that is presented in different format types. For example, when a video ad is presented, information about the performance of the video ad can be collected and stored, e.g., in a store of performance information 122. The performance information can be obtained, for example, from the content management system 110 which can track user reactions to the video content item. In some implementations, the performance information 122 can include statistics related to the number of times the video content item was presented, the number of times it was viewed by a user, the number of times the user interacted with (e.g., clicked on) the video content item causing the user to land on a landing page associated with the video content item, costs associated with the video content item, and so on.

In some implementations, the content management system 110 further includes a performance information aggregator 124 that aggregates the collected performance information relative to each of the different format types and summarizes the collected performance information relative to the video content item. For example, the performance information aggregator 124 can access performance information 122 for each of the format types associated with a video content item, including aggregating the performance information for each of the format types and preparing summary information for the video content item based on information for the different format types. A sponsor (e.g., advertiser) interface 130 can then present the aggregated performance information, e.g., in a user interface, in one or more reports, and/or in other ways.

In some implementations, the performance information aggregator 124 can aggregate performance information on an as-needed based, e.g., when the aggregated information is requested for a user interface, report, etc. For example, real-time aggregation can provide up-to-date information. In some implementations, aggregation can occur on a scheduled basis (e.g., daily, hourly, etc.), and the information can be stored and ready-to-use, e.g., in a user interface that a content sponsor can use to review performance of video ads.

In some implementations, any or all of the components of the content management system 110 can be separate from the content management system 110, or can be combined. For example, the performance information collector 120 and the performance information aggregator 124 can be combined into a single module. In some implementations, any or all of the components of the content management system 110 can be remote from the other components, e.g., distributed across the network 102.

In some implementations, the environment 100 can include a video analysis apparatus that tracks presentations of video content items (e.g., video advertisements) and provides advertisers information with which the advertisers can evaluate their video content items. The video analysis apparatus can also track presentations of target videos that are presented to users. The video analysis apparatus can be implemented independent of the content management system 110, but can also be implemented entirely, or in part, in the content management system 110.

In some implementations, the video analysis apparatus can track presentations of video content items (e.g., video advertisements) and/or target videos (i.e., non-advertisement videos) based on playback data received from a video player (or browser) in which the video content items and/or target videos are being presented. For example, as described in more detail below, the video player (or browser) can be configured to determine when presentation of a video reaches the end of a specified portion of the total duration of the video, generate playback data indicating that the presentation of the video has reached the end of the specified portion, and transmit the playback data to the video analysis apparatus. In turn, the video analysis apparatus can store the received playback data in a viewer log, which is a data store that stores the playback data for videos.

The video analysis apparatus can use the playback data for each video to provide video content owners or publishers (e.g., advertisers or other users that have uploaded videos) with information that facilitates evaluation of the performance of the video content item. In some implementations, the video analysis apparatus can use the playback data for a particular video (e.g., a particular video advertisement) to determine a portion of the presentations (e.g., a relative number of the presentations) of the particular video that reached a specified location in the video (e.g., 25% of the total duration) prior to presentation of the video being terminated. For example, if a particular video was presented at 100 different user devices, and 25 of the presentations reached 25% of the total duration, the video analysis apparatus could determine that 25% of the presentations of the video reached 25% of the total duration of the video.

A website 104 includes one or more resources 105 associated with a domain name and hosted by one or more servers. An example website is a collection of web pages formatted in hypertext markup language (HTML) that can contain text, images, multimedia content, and programming elements, such as scripts. Each website 104 can be maintained by a content publisher, which is an entity that controls, manages and/or owns the website 104.

A resource 105 can be any data that can be provided over the network 102. A resource 105 can be identified by a resource address that is associated with the resource 105. Resources include HTML pages, word processing documents, portable document format (PDF) documents, images, video, and news feed sources, to name only a few. The resources can include content, such as words, phrases, images and sounds, that may include embedded information (such as meta-information hyperlinks) and/or embedded instructions (such as JavaScript scripts).

A user device 106 is an electronic device that is under control of a user and is capable of requesting and receiving resources over the network 102. Example user devices 106 include personal computers, mobile communication devices (e.g., smartphones), and other devices that can send and receive data over the network 102. A user device 106 typically includes one or more user applications, such as a web browser, to facilitate the sending and receiving of data over the network 102.

A user device 106 can request resources 105 from a website 104. In turn, data representing the resource 105 can be provided to the user device 106 for presentation by the user device 106. The data representing the resource 105 can also include data specifying a portion of the resource or a portion of a user display, such as a presentation location of a pop-up window or a slot of a third-party content site or web page, in which content can be presented. These specified portions of the resource or user display are referred to as slots (e.g., ad slots).

To facilitate searching of these resources, the environment 100 can include a search system 112 that identifies the resources by crawling and indexing the resources provided by the content publishers on the websites 104. Data about the resources can be indexed based on the resource to which the data corresponds. The indexed and, optionally, cached copies of the resources can be stored in an indexed cache 114.

User devices 106 can submit search queries 116 to the search system 112 over the network 102. In response, the search system 112 accesses the indexed cache 114 to identify resources that are relevant to the search query 116. The search system 112 identifies the resources in the form of search results 118 and returns the search results 118 to the user devices 106 in search results pages. A search result 118 is data generated by the search system 112 that identifies a resource that is responsive to a particular search query, and includes a link to the resource. In some implementations, the content management system 110 can generate search results 118 using information (e.g., identified resources) received from the search system 112. An example search result 118 can include a web page title, a snippet of text or a portion of an image extracted from the web page, and the URL of the web page. Search results pages can also include one or more slots in which other content items (e.g., ads) can be presented.

When a resource 105, search results 118 and/or other content are requested by a user device 106, the content management system 110 receives a request for content. The request for content can include characteristics of the slots that are defined for the requested resource or search results page, and can be provided to the content management system 110. For example, slots can vary in spatial or temporal size.

For example, a reference (e.g., URL) to the resource for which the slot is defined, a size of the slot, and/or media types that are available for presentation in the slot can be provided to the content management system 110. Similarly, keywords associated with a requested resource ("resource keywords") or a search query 116 for which search results are requested can also be provided to the content management system 110 to facilitate identification of content that is relevant to the resource or search query 116.

Based at least in part on data included in the request, the content management system 110 can select content that is eligible to be provided in response to the request ("eligible content items"). For example, eligible content items can include eligible ads having characteristics matching the characteristics of ad slots and that are identified as relevant to specified resource keywords or search queries 116. It is in these ad slots in which video ads can be served, and the performance information collector 120 can collect performance information related to video ads that appear in the ad slots.

Different types of video content item formats can exist, including, but not limited a search-result-embedded format (e.g., a video that is provided as part of a search result), a selected-from-group format (e.g., a video that is provided in response to a selection made from a slate of available videos), an in-display format (e.g., a video that is provided as a user-selectable thumbnail within a banner or other display), or a stream-embedded format (e.g., a video that is provided before, during or after another content item in a stream). Each format can provide a different context in which the video content item is presented. By way of example, search-result-embedded video ads can include video ads that consist of a user-selectable thumbnail image or icon that appears inside a search result. Selected-from-group video ads can include video ads that result from user selection of a single thumbnail from a group (or slate) of thumbnails of video ads. In-display video ads can include video ads that appear as a user-selectable thumbnail in banner ads (e.g., at the top of a web page) or in some other type of display ad. Stream-embedded video ads can include short (e.g., 15-second, 30-second, etc.) video ads that play before, during or after video content (e.g., referred to as "pre-rolls," "mid-rolls," or "post-rolls"). Other formats are possible, and the methods, systems, user interfaces, etc. that are described in this document can be adapted for the other formats, including formats that apply to mobile devices.

While video ads are used as examples in this document, video ads in general can include any type of multi-media presentation that can occur in a content slot. For example, the methods, systems, etc. described in this document can apply to audio ads, animations, images, games, etc., or any combinations thereof. For example, one type of video ad is a video that is accompanied by text and/or an image, e.g., in a banner or a call-to-action. Other types of video ads can include videos that are accompanied by other types of content.

For situations in which the systems discussed here collect personal information about users, the users may be provided with an opportunity to opt in/out of programs or features that may collect personal information (e.g., information about a user's preferences, a user's current location, or a user's interaction with an ad). In addition, certain data may be anonymized in one or more ways before it is stored or used, so that personally identifiable information is removed. For example, a user's identity may be anonymized so that the no personally identifiable information can be determined for the user, or a user's geographic location may be generalized where location information is obtained (such as to a city, ZIP code, or state level), so that a particular location of a user cannot be determined. In some implementations, opt out features related to social networking systems, for example, can allow the user to specify that the user's activity stream content is not to be used in ads, or to anonymize the information in some way.

Figure 2:
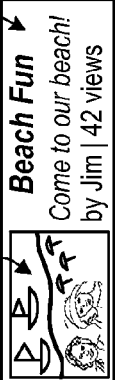
FIG. 2 shows an example interface for presenting aggregated performance information for video ads.

FIG. 2 shows an example interface screen 200 for presenting aggregated performance information for video content items. For example, the interface screen 200 can be provided by the interface 130 described above with reference to FIG. 1. Content sponsors, such as advertisers 108, can use the interface screen 200 to view aggregated statistics regarding video content items. In some implementations, the interface screen 200 includes an aggregated performance information area 202 that presents aggregated performance information regarding video content items, including information about a video content item 204. The video content item 204 can be one of many video content items for which aggregated performance information is presented on the interface screen 200.

A video display area 206 can display the video content item 204 and, optionally, summary information 208 related to the video content item 204 (e.g., including a title, a teaser, an author, a total number of views, etc.). In some implementations, the summary information 208 can be a companion banner ad that is displayed next to the video content item 204 when it appears and runs online, e.g., on a video-sharing website or some other online location. In this format, for example, a content sponsor can see exactly how the video content item 204 appears online. In some implementations, selecting the content item to be viewed can cause the launch of a separate viewing window and/or cause the presentation of controls by which the content sponsor can start, stop, reverse, pause, rewind, fast-forward, resize or perform other video-viewing actions and options. In some implementations, options can include sound options for controlling volume, including muting.

Statistical information 210 for the video content item 204 can appear on an aggregated line 212 for the content item. The statistical information 210 can aggregate corresponding information from detail lines 213 that contain information for the various formats of the video content item 204. For example, the statistical information 210 can provide totals and/or averages for numerical information in the detail lines 213. More or fewer detail lines 213a-213d can be displayed, depending on which formats apply to the video content item 204. For example, other video content items not shown in FIG. 2 can have fewer or more detail lines 213.

In some implementations, the statistical information 210 can include the content item's title and date 214 and the content item's status 216 (e.g., pending, serving, approved, disapproved, out-of-budget, paused, etc.). An impression count 218 can identify the number of impressions of various types, including for example, thumbnail impressions 218a and video impressions 218b. Videos that are presented as thumbnails, for example, can require user action (e.g., selecting a start control) for the video to begin. Videos that are presented as video impressions can start automatically. Different formats can have different types of possible impressions, e.g., search-result-embedded, selected-from-group and in-display video formats can be limited to thumbnail only, meaning that entries can exist in the thumbnail impressions 218a column, while null (e.g., a hyphen) or zero values exist in the video impressions 218b column. Conversely, stream-embedded format content items can be limited to video impressions 218b. As an example, selected-from-group format video content items can be limited to having entries in the thumbnail impressions 218a column because, in the selected-from-group format, users can be presented with a thumbnail for each video in a group (or slate) of videos from which the user can select one to watch.

A view count 220 can identify the number of times that the video was viewed in its entirety by a user. In some implementations, other statistics can identify partial viewings, e.g., if a user starts to watch the video but exits before the video completes. A view rate 222 can identify a percentage rate of viewings, for example, calculated as the view count 220 divided by the impression count 218. In some implementations, the percentages can be displayed in various ways, e.g., to include additional digits of precision after the decimal point. A cost-per-view 224 identifies the cost amount for the average view (e.g., based on the view count 220). A total cost 226 can identify the total cost of the viewings, e.g., calculated as the product of the view count 220 and the cost-per-view 224. A website clicks count 228 can identify the number of viewings that resulted in a click-through to a home page, an advertiser's landing page, or some other web page associated with (and selectable from) the content item.

Indented underneath the aggregated line 212, the detail lines 213 provide information for various types of video formats (e.g., search-result-embedded, selected-from-group, in-display, and stream-embedded) in which the video content item 204 can appear. Each of the detail lines 213 can be labeled 230 with the names of the various types of video formats. Providing the information in the aggregated performance information area 202 in this way can allow the content sponsor to view information for each video format independently, as well as allowing comparisons of information among the various video formats, and to see the aggregated information (e.g., for all video formats on the detail lines 213) on the aggregated line 212.

In some implementations, multiple levels of aggregation can exist in the aggregated performance information area 202. For example, the search-result-embedded video format represented by line 213a can have sub-types, meaning that there can be different categories or types of search-result-embedded video formats, or different ways that search-result-embedded videos can be presented. In this case, information for each of the search-result-embedded sub-types can appear on a separate one of the detail lines 213, e.g., indented underneath the line 213a. As a result, the line 213a itself can be an aggregated line (e.g., for the two sub-types, which are not shown in FIG. 2). At the same time, the line 213a can be a detail line under the aggregated line 212 for the video content item 204.

In another example, in-display videos represented by line 213d can have different sub-types (e.g., corresponding to "pre-rolls," "mid-rolls," and "post-rolls"). In general, the aggregated performance information area 202 can display any feasible number of hierarchical levels of information, and other formats not shown in the detail lines 213 can exist. In some implementations, information in the aggregated performance information area 202 can be sorted or totaled in other ways, e.g., to display or hide information for specific formats.

In some implementations, the aggregated performance information area 202 can provide other types of aggregation that are not shown in FIG. 2. For example, additional detail lines similar to the detail lines 213 can exist for different networks on which the video content item is presented. In some implementations, other types of aggregation can be used, e.g., based on demographics, time or geographic location.

In some implementations, the user can use controls 232 to control how information is displayed for a particular video content item. For example, for the aggregated line 212, if the user selects (e.g. clicks on) a negative sign in a box 233, then the detailed information can collapse, e.g., temporarily hiding the detail lines 213a-213b. The display of detailed information can be restored, for example, if the user selects a plus sign or other expansion control.

In some implementations, the user can use any of the preview controls 234 to preview a video content item in a particular format. For example, by selecting the preview control 234 on the "in-search" detail line 213a, the user can preview the video content item 204 as it appears in the search-result-embedded format. In some implementations, when a video content item is previewed, a separate window can appear in which the video content item is presented, and the user can see how the video content item appears in that format. Other mechanisms for previewing the video content item can be used.

In some implementations, the user can use an edit control 236 to update the video content item or to perform some other maintenance on the video content item. In some implementations, user selection of the edit control 236 can cause a video content item definition/maintenance interface to launch.

In some implementations, controls 240, 242 or other controls can provide user help or other information. For example, if the user selects one of the controls 240, a popup or other dialog box can appear that explains how information in that particular column is determined or what the information means. Controls 242, if selected by the user, can cause information to be displayed that describes what a function does (e.g., the preview ads control 234 or the edit control 236).

Figure 3:
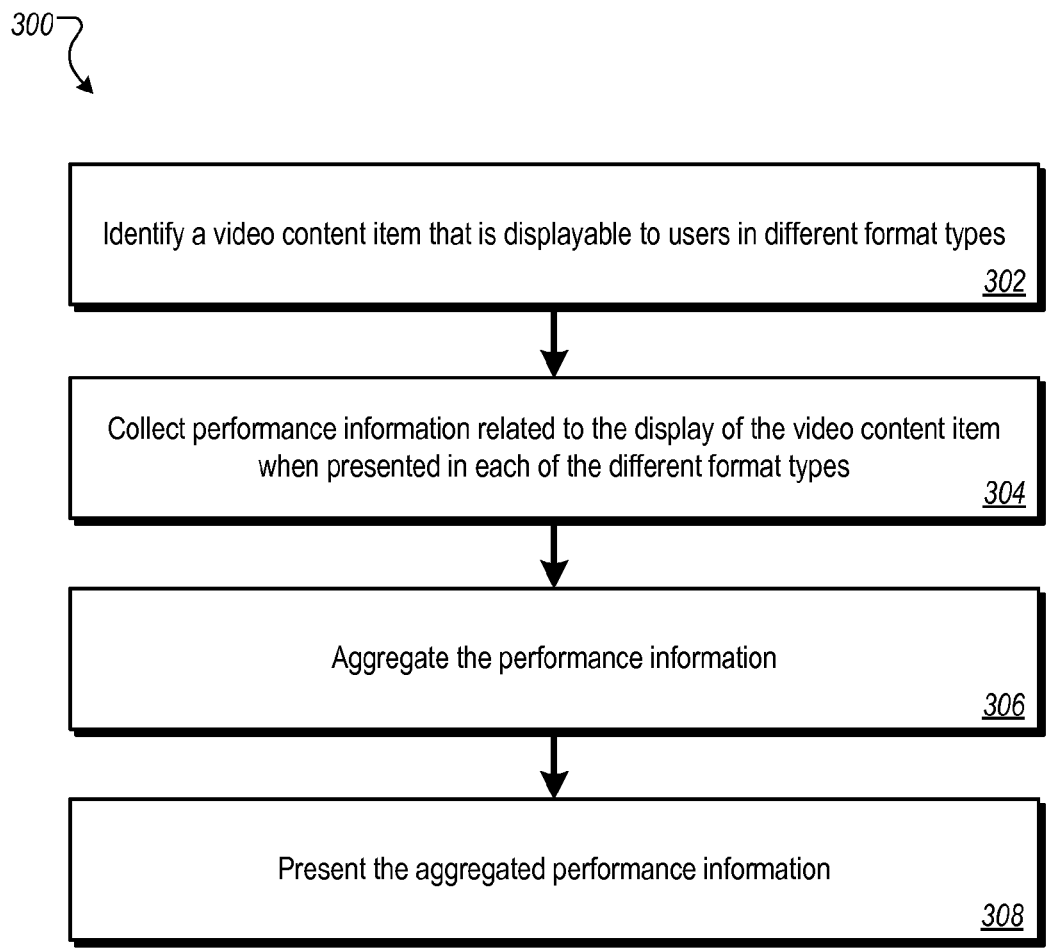
FIG. 3 is a flowchart of an example process for presenting aggregated performance information for video ads.

FIG. 3 is a flowchart of an example process 300 for presenting aggregated performance information for video content items. The process 300 can be performed by the aggregated performance information collector 120, the performance information aggregator 124, and by way of the interface 130. FIGS. 1 and 2 are used to provide examples for steps of the process 300.

A video content item is identified that is displayable to users in a plurality of different format types (302). For example, the content management system 110 can identify a video ad for which one or more format types exist (e.g., search-result-embedded, selected-from-group, in-display, and stream-embedded). In some implementations, the content management system 110 can provide the identification of the video ad to the performance information collector 120. In some implementations, the performance information collector 120, for example, can set up buckets in the performance information 122 in preparation of collecting performance information for the video ad, including each of the video ad's format types.

Performance information is collected that is related to the display of the video content item when presented in each of the different format types (304). The performance information can include information related to a number of thumbnail impressions, a number of video impressions, a number of views, a view rate, an average cost-per-view, a total cost, and/or a number of clicks to a landing page. As an example, the performance information collector 120 can collect performance information for the video ad. The collection of performance information can occur over time as the video ad is presented in the different format types to potentially thousands or millions of users. The collection can also include information regarding user actions that occur after the video ad is presented (e.g., viewings, click-throughs, etc.).

The performance information is aggregated for the different format types, including providing overall performance information for the video content item (306). For example, the performance information aggregator 124 can aggregate the collected performance information relative to each of the different format types and provide a summary relative to the video ad as a whole. In some implementations, the performance information aggregator 124 can access performance information 122 for each of the format types associated with a video content item, including aggregating the performance information for each of the format types and preparing summary information for the video content item based on information for the different format types.

The aggregated performance information is presented (308). For example, the interface 130 can present the aggregated information in the interface screen 200, in a report, or in other ways.

Figure 4:
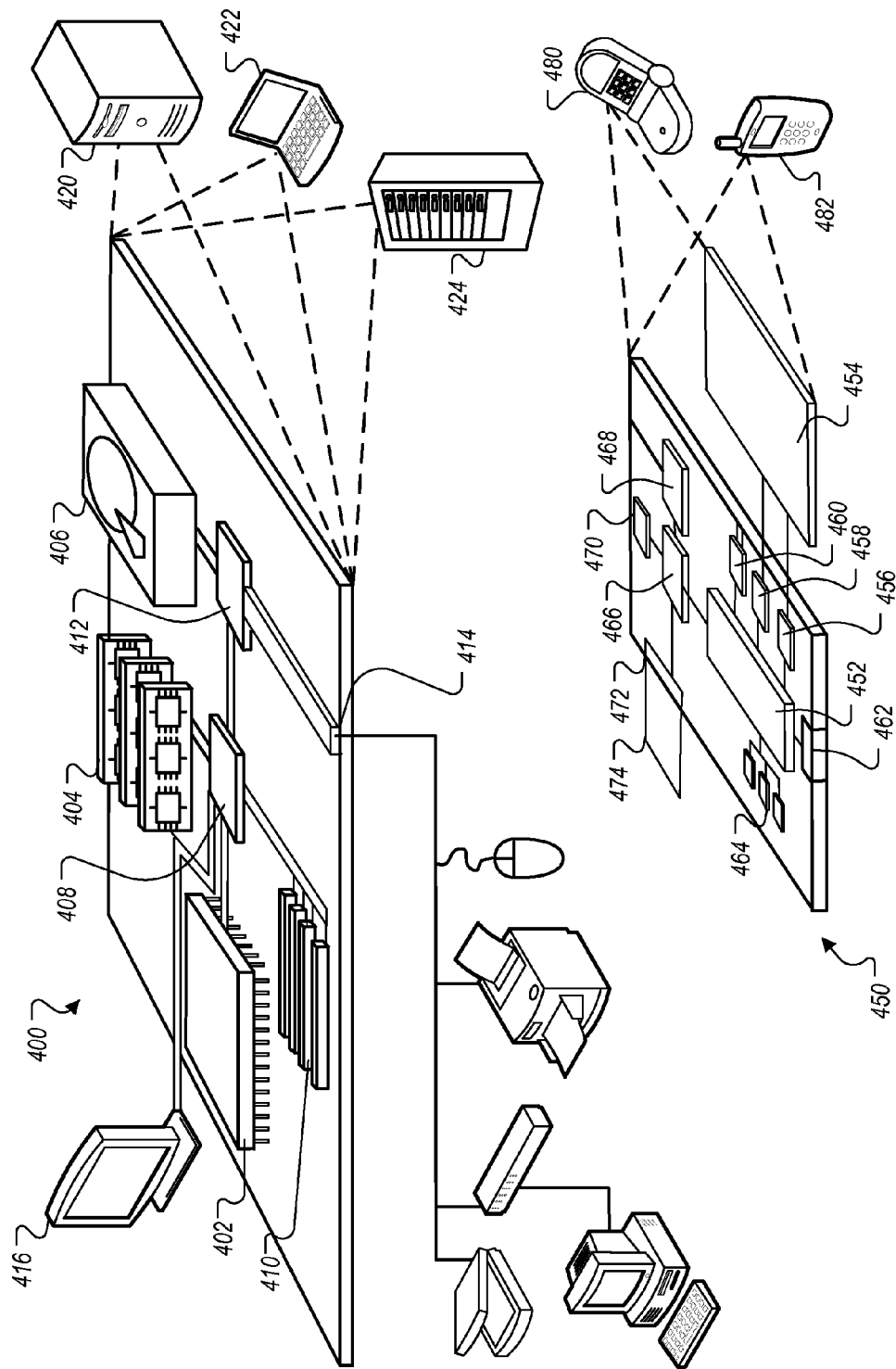
FIG. 4 is a block diagram of an example computer system that can be used to implement the methods, systems and processes described in this disclosure.

FIG. 4 is a block diagram of computing devices 400, 450 that may be used to implement the systems and methods described in this document, as either a client or as a server or plurality of servers. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a computer-readable medium. In one implementation, the memory 404 is a volatile memory unit or units. In another implementation, the memory 404 is a non-volatile memory unit or units.

The storage device 406 is capable of providing mass storage for the computing device 400. In one implementation, the storage device 406 is a computer-readable medium. In various different implementations, the storage device 406 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 404, the storage device 406, or memory on processor 402.

The high speed controller 408 manages bandwidth-intensive operations for the computing device 400, while the low speed controller 412 manages lower bandwidth-intensive operations. Such allocation of duties is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can process instructions for execution within the computing device 450, including instructions stored in the memory 464. The processor may also include separate analog and digital processors. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT LCD display or an OLED display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provided in communication with processor 452, so as to enable near area communication of device 450 with other devices. External interface 462 may provide, for example, for wired communication (e.g., via a docking procedure) or for wireless communication (e.g., via Bluetooth or other such technologies).

The memory 464 stores information within the computing device 450. In one implementation, the memory 464 is a computer-readable medium. In one implementation, the memory 464 is a volatile memory unit or units. In another implementation, the memory 464 is a non-volatile memory unit or units. Expansion memory 474 may also be provided and connected to device 450 through expansion interface 472, which may include, for example, a SIMM card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provide as a security module for device 450, and may be programmed with instructions that permit secure use of device 450. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS receiver module 470 may provide additional wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
    identifying, by a system including a processor, a video content item, the video content item being displayable in a plurality of different format types to users;
    collecting, by the system, performance information related to the display of the video content item when presented in each of the different format types, where the performance information includes information selected from a group comprising at least one of a number of thumbnail impressions, a number of video impressions, a number of views, a view rate, an average cost-per-view, a total cost, or a number of clicks to a landing page, and the collecting includes determining respective networks on which the different format types of the video content item are presented;
    aggregating, by the system, the performance information for the different format types, including providing overall performance information for the video content item, where the aggregating includes aggregating respective performance information for the presentation of the different format types on the networks; and
    presenting, by the system, the aggregated performance information for the video content item.

2. The method of claim 1 where the format type is search-result-embedded, where the search-result-embedded format type includes video content items that include a user-selectable thumbnail image or icon that is embedded inside a search result.

3. The method of claim 1 where the format type is selected-from-group, where the selected-from-group format type includes video content items that are user-selectable from a group of thumbnails of video content items.

4. The method of claim 1 where the format type is in-display, where the in-display format type includes video content items that appear as a user-selectable thumbnail within a banner or other display.

5. The method of claim 1 where the format type is stream-embedded, where the stream-embedded format type includes video content items that play before, during or after video content viewed by a user.

6. The method of claim 1 where the collecting includes determining when a video content item is presented, determining the format type, gathering performance information for the presentation, and storing the performance information.

7. The method of claim 1 where the aggregating includes aggregating performance information for each format type.

8. The method of claim 1 where the presenting includes presenting a user interface including providing aggregated performance information to a sponsor of the video content item.

9. The method of claim 1 where the presenting includes presenting performance information for the video content item in conjunction with performance information for each of the format types.

10. The method of claim 1 where the format types have one or more levels of subtypes.

11. The method of claim 1 where the presenting includes providing a report that includes the aggregated performance information.

12. The method of claim 6 where the collecting includes determining if the video content item was viewed during the presentation.

13. The method of claim 6 where the collecting includes determining a percentage portion of the video content item that was viewed during the presentation.

14. The method of claim 6 where the collecting includes determining if the user clicked through to a web page associated with the video content item.

15. The method of claim 8 where the user interface includes controls for controlling a presentation format and content of the aggregated performance information.

16. A system, comprising:
a processor; and
a memory communicatively coupled to the processor, the memory having stored therein computer-executable instructions, comprising:
 a performance information collector that collects performance information corresponding to presentations of a video content item that is presented in different format types, where the performance information includes information selected from a group comprising at least one of a number of thumbnail impressions, a number of video impressions, a number of views, a view rate, an average cost-per-view, a total cost, or a number of clicks to a landing page, where the performance information collector is further configured to determine respective networks on which the different format types of the video content item are presented;
 a performance information aggregator that aggregates the collected performance information relative to each of the different format types and summarizes the collected performance information relative to the video content item, where the collected performance information includes aggregated respective performance information for the presentation of the different format types on the networks; and
 an interface for presenting the aggregated performance information.

17. The system of claim 16, where the interface is further configured to provide a report that includes the aggregated performance information.

18. A non-transitory computer-readable medium having instructions stored thereon that, in response to execution, cause a system including a processor to perform operations comprising:
identifying a video content item, the video content item being displayable in a plurality of different format types to users;
collecting performance information related to the display of the video content item when presented in each of the different format types, where the performance information includes information selected from a group comprising at least one of a number of thumbnail impressions, a number of video impressions, a number of views, a view rate, an average cost-per-view, a total cost, or a number of clicks to a landing page, and the collecting includes determining respective networks on which the different format types of the video content item are presented;
aggregating the performance information for the different format types, including providing overall performance information for the video content item, where the aggregating includes aggregating respective performance information for the presentation of the different format types on the networks; and
presenting the aggregated performance information for the video content item.

19. The non-transitory computer-readable medium of claim 18, where the format types have one or more levels of subtypes.

20. The non-transitory computer-readable medium of claim 18, where the presenting includes providing a report that includes the aggregated performance information.

* * * * *